(12) United States Patent
Andreasson

(10) Patent No.: US 8,094,891 B2
(45) Date of Patent: Jan. 10, 2012

(54) GENERATING MUSIC PLAYLIST BASED ON FACIAL EXPRESSION

(75) Inventor: Markus Mans Folke Andreasson, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 1104 days.

(21) Appl. No.: 11/933,611

(22) Filed: Nov. 1, 2007

(65) Prior Publication Data
US 2009/0116684 A1    May 7, 2009

(51) Int. Cl.
  G06K 9/00    (2006.01)
  G09B 5/00    (2006.01)
  G10H 7/00    (2006.01)
  A63H 3/28    (2006.01)

(52) U.S. Cl. .................. 382/118; 382/103; 434/307 A; 84/645; 446/297

(58) Field of Classification Search .................. 382/118, 382/103; 434/307 A; 84/1, 600, 601, 645, 84/453, 602, 609, 610, 611, DIG. 12; 446/175, 446/297
See application file for complete search history.

(56) References Cited

U.S. PATENT DOCUMENTS

| | | | |
|---|---|---|---|
| 4,499,462 A * | 2/1985 | Stoesser et al. | 340/5.51 |
| 2002/0113687 A1 | 8/2002 | Center, Jr. et al. | |
| 2005/0098023 A1 | 5/2005 | Toivonen et al. | |
| 2006/0143647 A1 * | 6/2006 | Bill | 725/10 |

FOREIGN PATENT DOCUMENTS

EP    1 503 366 A1    2/2005

OTHER PUBLICATIONS

Pantic, M. et al.: Automatic Analysis of Facial Expressions: The State of the Art; IEEE Transactions on Pattern Analysis and Machine Intelligence, vol. 22, No. 12, Dec. 2000, pp. 1424-1445.
International Search Report and Written Opinion issued in corresponding international application No. PCT/IB2008/051662, mailed Sep. 29, 2008, 13 pages.

* cited by examiner

*Primary Examiner* — Sheela Chawan
(74) *Attorney, Agent, or Firm* — Snyder, Clark, Lesch & Chung, LLP

(57) ABSTRACT

A method may include playing a first song on a device, capturing an image of a user, performing facial expression recognition of the user based on the image, and selecting a second song based on a facial expression of the user.

22 Claims, 8 Drawing Sheets

GENERATING MUSIC PLAYLIST BASED ON FACIAL EXPRESSION

BACKGROUND

With the ever-growing popularity of acquiring music, a variety of consumer devices may include a digital media player (DMP) or a digital audio player (DAP) to play and manage digital music files. In some instances, the consumer device may be a single functional device. In other instances, the consumer device may be a multifunctional device, such as a mobile phone, a personal digital assistant (PDA), or a handheld computer. Since these types of consumer devices continually become more portable and versatile, our reliance on such devices for entertainment purposes has grown.

In some instances, a user may create a playlist. The playlist may include one or more songs selected by the user that may be played, for example, in sequence or in random order. However, the process of creating a playlist can be time-consuming and burdensome.

SUMMARY

According to one aspect, a method may include playing a first song on a device, capturing an image of a user of the device, performing facial expression recognition of the user based on the image, and selecting a second song based on a facial expression of the user.

Additionally, the capturing may include automatically capturing the image of the user based on the playing of the first song.

Additionally, the performing may include determining a mood of the user.

Additionally, the method may include identifying one or more musical characteristics of the first song.

Additionally, the method may include determining at least one of the artist of the first song or the genre of the first song.

Additionally, the selecting may include selecting the second song based on the one or more musical characteristics of the first song.

Additionally, the method may include playing the second song on the device.

Additionally, the selecting may include selecting the second song based on the first song.

According to another aspect, a device may include a memory to store instructions and a processor to execute the instructions. The processor may execute instructions to capture an image of a user, perform facial expression recognition based on the image, and select one or more songs to be played on the device based on a mood of the user.

Additionally, the image of the user may be captured based on at least one of the user's interaction with the device or a periodic timing mechanism.

Additionally, the processor may further execute instructions to identify the mood of the user based on one or more characteristics of a facial expression of the user contained in the image.

Additionally, the processor may further execute instructions to identify the user based on the image.

Additionally, to select the one or more songs, the processor may further execute instructions to access a music library associated with the identified user.

Additionally, the processor may further execute instructions to identify a musical characteristic of a song playing on the device when the image is captured.

Additionally, the one or more songs may be selected based on the musical characteristic of the song.

According to yet another aspect, a computer-readable medium may contain instructions that may be executable by at least one processor. The computer-readable medium may include one or more instructions for capturing an image of a user, one or more instructions for performing facial expression recognition based on the image, and one or more instructions for selecting one or more songs to be played based on a category of a facial expression of the user.

Additionally, the computer-readable medium may include one or more instructions for creating an active playlist, where the active playlist may include a first song being played.

Additionally, the one or more instructions for selecting may include one or more instructions for creating a first playlist based on the one or more songs.

Additionally, the computer-readable medium may include one or more instructions for selecting one or more songs from the first playlist, and one or more songs for playing the selected one or more songs from the first playlist.

Additionally, the computer-readable medium may include one or more instructions for determining whether the user stops the selected one or more songs from playing to play a different song.

Additionally, the computer-readable medium may include one or more instructions for assigning a reinforcement value to each of the selected one or more songs, if the user does not stop the selected one or more songs from playing.

According to still another aspect, a device may include means for playing a song, means for capturing an image of a user, means for determining a mood of the user based on the image, and means for selecting another song to be play based on the mood.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention. The term "music" is intended to be broadly interpreted to include any type of musical work. The term "song" may be used interchangeably with the term "music" depending on context.

Overview

Figure 1:
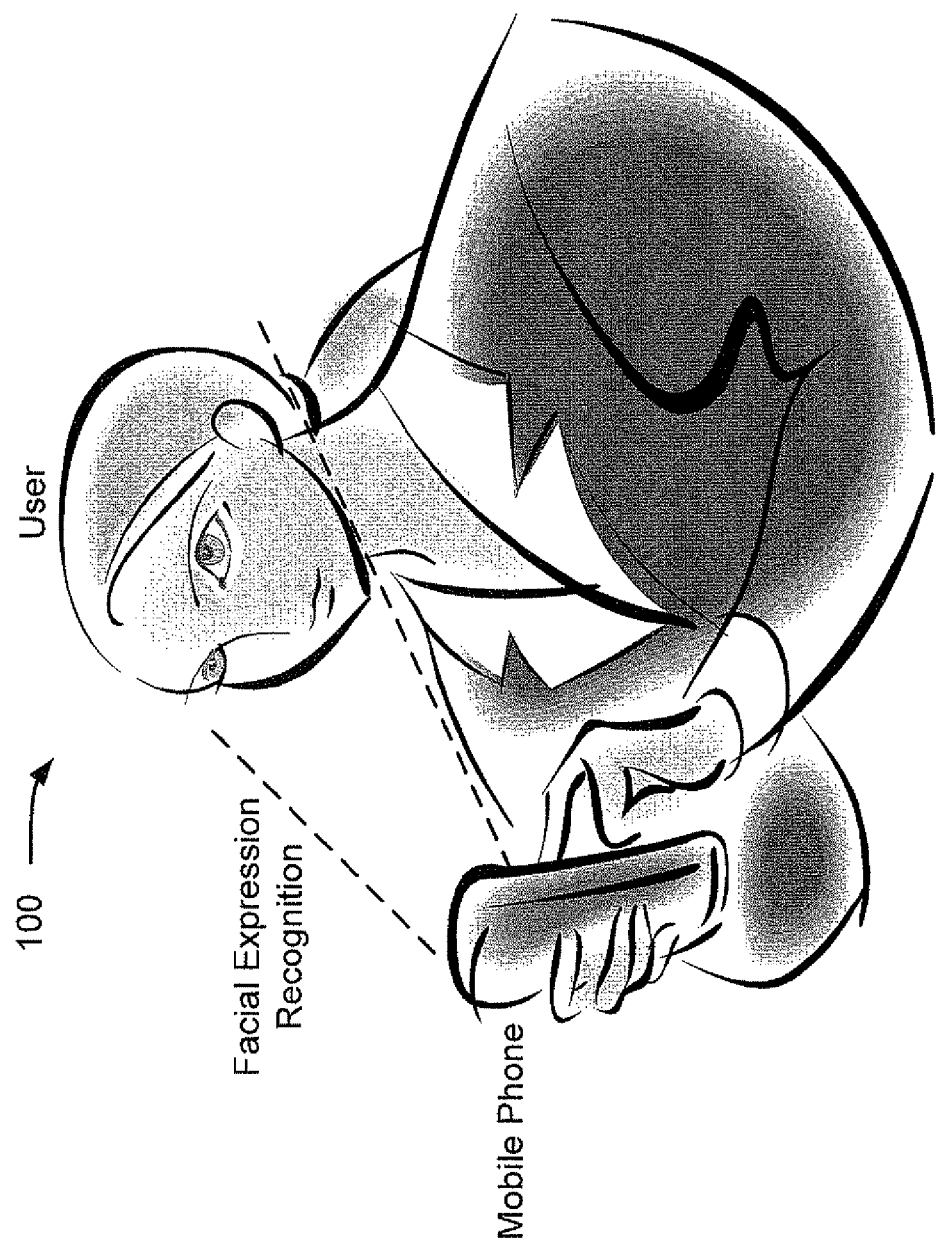
FIG. 1 is a diagram illustrating concepts described herein.

FIG. 1 is a diagram illustrating concepts as described herein. As illustrated, an environment 100 may include a user operating a consumer device, such as a mobile phone. The mobile phone may include a digital audio player (DAP) and an image capturing component, such as a camera. Additionally, the mobile phone may include a facial expression recognition component.

In one implementation, if the user interacts with mobile phone, the camera may capture a still image and/or video images of the user's face. The facial expression recognition component may utilize the user's facial image(s) to determine facial characteristics of the user. The facial characteristics may be compared to previously defined categories of facial characteristics. If the facial characteristics match a facial characteristic category, a link may be made between the facial characteristic category and the music currently playing and/or music similar to the current music playing. If the facial characteristics do not match a facial characteristic category, a new facial characteristic category may be created based on the facial characteristics. A link may be made between the new facial characteristic category and the music currently playing and/or music similar to the current music playing.

In view of these determinations, a potential playlist containing a list of potential songs may be created. For example, when the current music ends, a song may be selected from the potential playlist. As a result of the foregoing, the active playlist may automatically be updated based on the facial expression of the user. In this manner, a user may listen to music that more closely matches the user's mood at the time.

Exemplary Device

Figure 2:
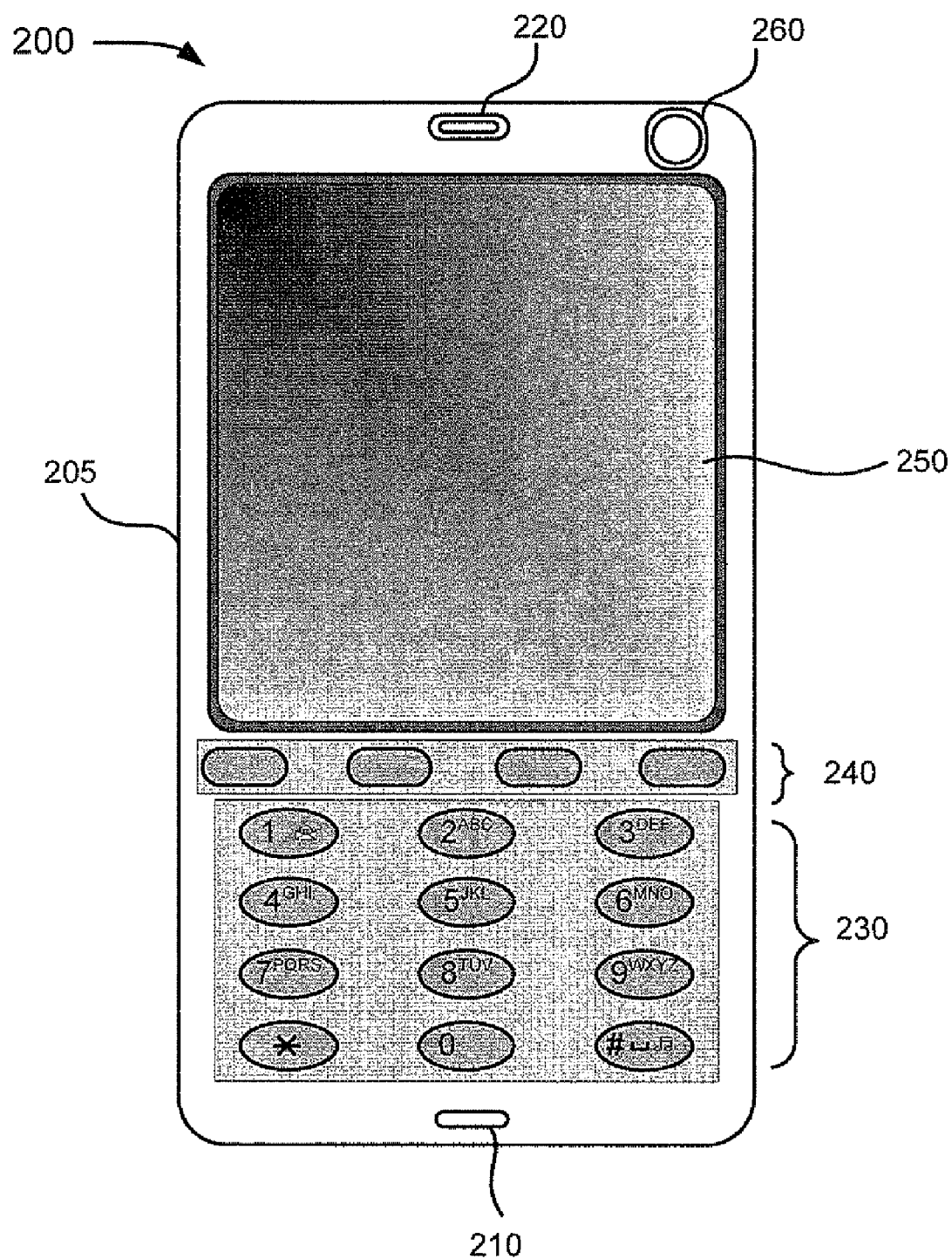
FIG. 2 is a diagram illustrating a front view of exemplary external components of an exemplary device.

FIG. 2 is a diagram illustrating a front view of exemplary external components of an exemplary device. As illustrated, device 200 may include a housing 205, a microphone 210, a speaker 220, a keypad 230, function keys 240, a display 250, and/or a camera 260. The term "component," as used herein, is intended to be broadly interpreted to include hardware, software, and/or a combination of hardware and software.

Housing 205 may include a structure to contain components of device 200. For example, housing 205 may be formed from plastic or metal and may support microphone 210, speaker 220, keypad 230, function keys 240, display 250, and camera 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 200. Keypad 230 may include a standard telephone keypad. Keypad 230 may also include one or more special purpose keys. In one implementation, each key of keypad 230 may be, for example, a pushbutton, an area on a touch-sensitive screen, etc. A user may utilize keypad 230 for entering information, such as text or a phone number, or activating a special function.

Function keys 240 may include any component capable of providing input to device 200. Function keys 240 may include a key that permits a user to cause device 200 to perform one or more operations. The functionality associated with a key of function keys 240 may change depending on the mode of device 200. For example, function keys 240 may perform a variety of operations, such as placing a telephone call, playing various media (e.g., music, videos), sending e-mail, setting various camera features (e.g., focus, zoom, etc.) and/or accessing an application. Function keys 240 may include a key that provides a cursor function and a select function. In one implementation, each key of function keys 240 may be, for example, a pushbutton, an area on a touch-sensitive screen, etc.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may display, for example, text, image, and/or video information.

Camera 260 may include any component capable of capturing a still image and/or video images. Camera 260 may be a digital camera. Camera 260 may provide for automatic and/or manual adjustment of a camera setting. In one implementation, device 200 may include camera software that provides various functions that may be displayed on display 250 to allow a user to, for example, adjust camera settings. For example, a user may be able adjust a camera setting by operating function keys 240.

Device 200 is intended to be broadly interpreted to include any number of devices used to play music. For example, device 200 may include a portable device, such as a wireless telephone, a personal digital assistant (PDA), an audio player and/or an audio/video player, such as an MP3 player, a game system, a computer, or another kind of DMP or DAP device. In other instances, device 200 may include a stationary device, such as an audio system, an audio/video system, a game system, a computer, or another kind of DMP or DAP device. Still further, device 200 may include a DMP or DAP device in an automobile, in an airplane, etc. Accordingly, although FIG. 2 illustrates exemplary external components of device 200, in other implementations, device 200 may contain fewer, different, or additional external components than the external components depicted in FIG. 2. For example, although not illustrated, device 200 may include a communication port, such as an infrared port and/or a Universal Serial Bus (USB) port. Additionally, or alternatively, one or more external components of device 200 may perform the functions of one or more other external components of device 200. For example, display 250 may be an input component (e.g., a touch screen). Additionally, or alternatively, the external components may be arranged differently than the external components depicted in FIG. 2.

Figure 3:
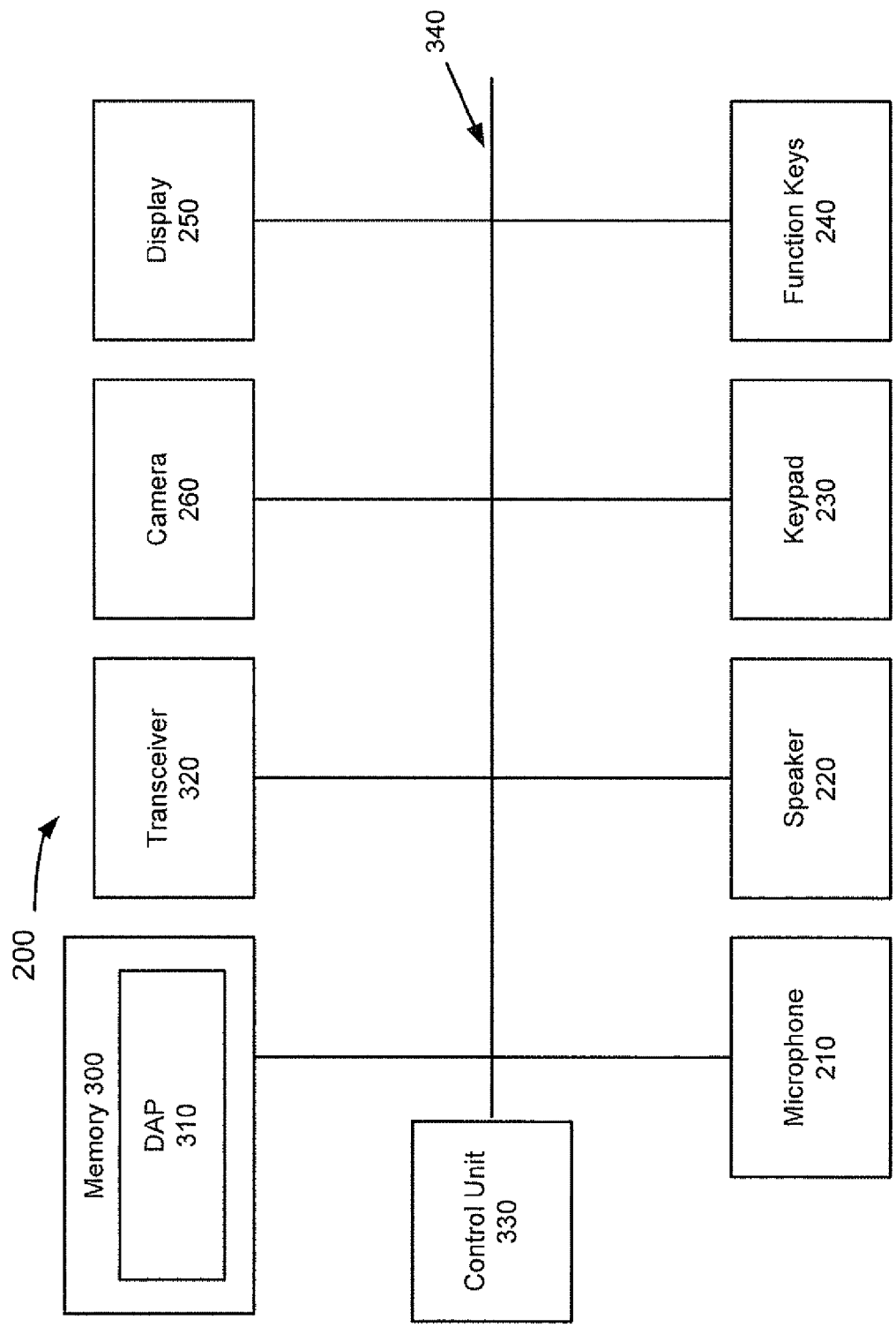
FIG. 3 is a diagram illustrating exemplary internal components that may correspond to the device depicted in FIG. 2.

FIG. 3 is a diagram illustrating exemplary internal components of the device depicted in FIG. 2. As illustrated, device 200 may include microphone 210, speaker 220, keypad 230, function keys 240, display 250, camera 260, a memory 300 (with a DAP 310), a transceiver 320, a control unit 330, and a bus 340. Microphone 210, speaker 220, keypad 230, function keys 240, display 250, and camera 260 may include the features and/or capabilities described above in connection with FIG. 2.

Memory 300 may include any type of storage component that stores data and instructions related to the operation and use of device 200. For example, memory 300 may include a memory component, such as a random access memory (RAM), a dynamic random access memory (DRAM), a static random access memory (SRAM), a synchronous dynamic random access memory (SRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Additionally, memory 300 may include a storing component, such as a magnetic storage component (e.g., a hard drive), a CD drive, a DVD drive, or another type of computer-readable medium. Memory 300 may also include an external storing component, such as a USB memory stick, a memory card, and/or a Subscriber Identity Module (SIM) card.

Memory 300 may further include DAP 310. DAP 310 may include a component for enabling device 200 to generate playlists based on facial expressions of a user. DAP 310 will be described in greater detail below in connection to FIG. 4. Alternatively, DAP 310 may be located external to memory 300. DAP 310 may access memory 300 to play music.

Transceiver 320 may include any component capable of transmitting and receiving data. For example, transceiver 320 may include a radio circuit that provides wireless communication with a network or another device. Transceiver 320 may support wireless communication.

Control unit 330 may include any logic that interprets and executes instructions to control the overall operation of device 200. Logic, as used herein, may include hardware, software, and/or a combination of hardware and software. Control unit 330 may include, for example, a general-purpose processor, a microprocessor, a data processor, a co-processor, a network processor, an application specific integrated circuit (ASIC), a controller, a programmable logic device, a chipset, a field programmable gate array (FPGA), etc. Control unit 330 may access instructions from memory 300, from other components of device 200, and/or from a source external to device 200 (e.g., a network or another device). Control unit 330 may provide for different operational modes associated with device 200. Additionally, control unit 330 may operate in multiple operational modes simultaneously. For example, control unit 330 may operate in a camera mode, a music playing mode, and/or a telephone mode.

Bus 340 may include a communication path that allows communication among the components of device 200. Bus 340 may include, for example, a system bus, an address bus, a data bus, and/or a control bus. Bus 340 may include bus drivers, bus arbiters, bus interfaces and/or clocks.

Device 200 depicted in FIG. 3 may perform certain operations relating to DAP 310. Device 200 may perform these operations in response to control unit 330 executing software instructions contained in a computer-readable medium, such as memory 300. A computer-readable medium may be defined as a physical or logical memory device. The software instructions may be read into memory 300 and may cause control unit 330 to perform processes associated with DAP 310. Alternatively, hardwired circuitry may be used in place of or in combination with software instructions to implement processes described herein. Thus, implementations described herein are not limited to any specific combination of hardware circuitry and software.

Although FIG. 3 illustrates exemplary internal components, in other implementations, fewer, additional, and/or different internal components than the internal components depicted in FIG. 3 may be employed. For example, one or more internal components of device 200 may include the capabilities of one or more other components of device 200. For example, transceiver 320 and/or control unit 310 may include their own on-board memory 300. Additionally, or alternatively, device 200 may not include microphone 210, transceiver 320, and/or function keys 240.

Figure 4:
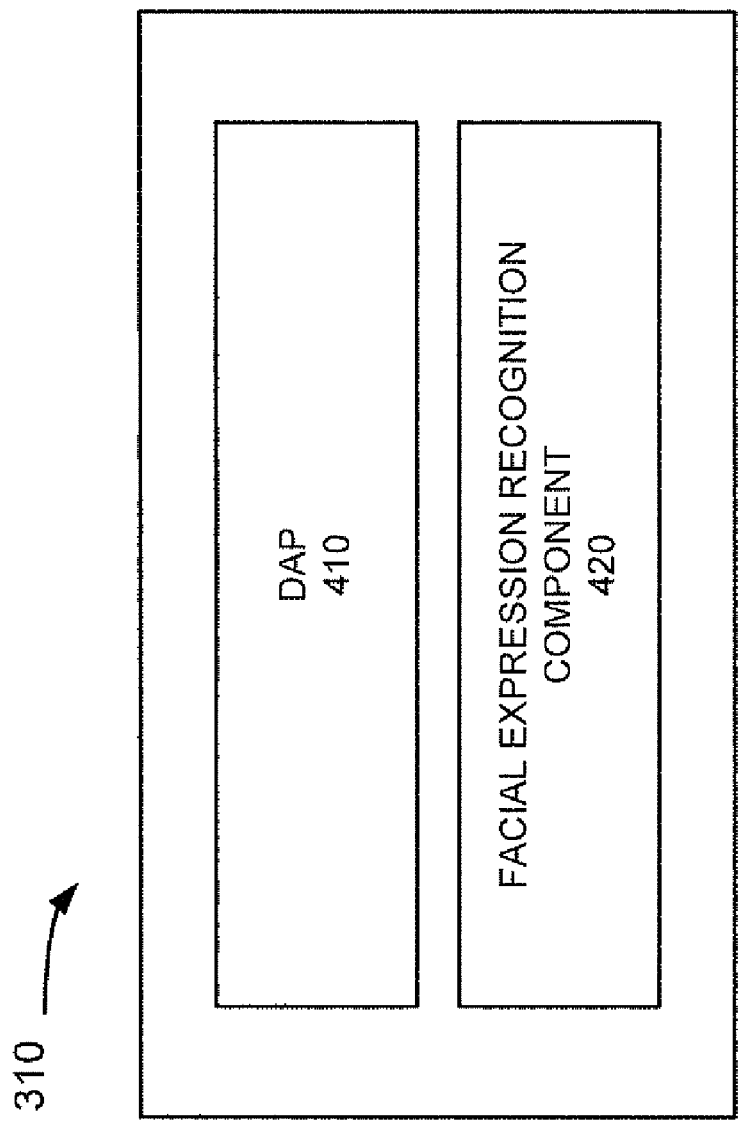
FIG. 4 is a diagram illustrating exemplary functional components that may correspond to the DAP depicted in FIG. 3.

FIG. 4 is a diagram illustrating exemplary functional components that may correspond to the DAP depicted in FIG. 3. As illustrated, DAP 310 may include a DAP 410 and a facial expression recognition (FER) component 420.

Facial recognition and facial expression recognition architectures and processing techniques may overlap. That is, while the focus of facial expression recognition may rest with the expression of the user, facial expression information may also include information, such as the identity of the user. Conversely, while the focus of facial recognition may rest with the identity of the user, facial recognition information may also include information, such as the facial expression of the user. In consideration of these factors, facial recognition of the user may or may not be useful depending on, for example, the number of users of device 200.

DAP 410 may include a component capable of playing digital music files. DAP 410 may include a user interface (UI) that permits a user to select songs, create playlists, adjust audio settings (e.g., volume, equalization), adjust skin settings, and/or adjust visual settings. DAP 410 may support a number of different digital music file formats, such as Moving Picture Experts Group-1 (MPEG-1) audio layer 3 (MP3), audio video interleave (.avi), waveform audio format (.wav), Quicktime (.qt), Windows Media Audio (.wma), audio (.au), real audio media (.ram), real audio (.ra), Musical Instrument Digital Interface (.midi), etc.

FER component 420 may include logic capable of identifying a user's facial expression. There are a variety of recognition techniques that may be employed. For example, two general approaches for identifying a facial expression are a piecemeal approach and a holistic approach. A piecemeal approach for facial expression recognition may involve a number of feature classifiers and some combiner unit. On the other hand, in a holistic approach, the whole face may be extracted and provided to a expression recognition system. However, in other instances, a hybrid approach may be employed.

In general, these approaches may include an image acquisition stage, a pre-processing stage, a feature extraction stage, a classification stage, and a post-processing stage.

The image acquisition stage may include camera 260 capturing a still image and/or video images of a user. Camera 260 may capture a still image and/or video images of the user based on, for example, a triggering event. The triggering event may include, for example, a user's interaction with device 200. For example, the user may change the volume of device 200 or utilize other components (e.g., opening an application, pressing a key, etc.) of device 200. In other instances, device 200 may include a self-triggering event. For example, camera 260 may capture a still image and/or video images of the user in a periodic manner based on a timing mechanism (e.g., a clock). Additionally, or alternatively, device 200 may include a motion sensor (not shown in figures) which may trigger camera 260 to capture an image of the user.

The preprocessing stage may include signal conditioning of the still image and/or video images. For example, signal conditioning may include noise removal and/or normalization processes. Additionally, or alternatively, signal conditioning may include segmentation and/or location and tracking of the user's face and/or facial parts (e.g., eyes, mouth, nose, etc.).

The feature extraction stage may include converting pixel data into representations of shape, motion, spatial configuration of the face and/or of facial components, texture and/or color. In one implementation, a characteristic vector capable of identifying a user's face may be extracted from a facial image in order to recognize the user's face. For example, principal component analysis (PCA) and/or linear discriminant analysis (LDA) approaches may be employed. In other instances, feature extraction may be based on, for example, an eigenface algorithm.

The classification stage may include expression categorization. Expression categorization may include, for example, templates of pattern distribution and decision procedures. Prototypical expressions relating to emotional states of happiness, sadness, surprise, anger, fear, disgust, neutrality, etc., may be employed. In other implementations, a more granulated categorization may be utilized. The post-processing stage may include processing to minimize classification errors.

FER component 420 may identify the facial expression of a user. Additional processes may be performed in relation to DAP 410, as will be described in greater detail below.

Although FIG. 4 illustrates exemplary functional components, in other implementations, fewer, additional, and/or different functional components than those described in relation to FIG. 4 may be employed. For example, instead of device 200 including DAP 310, device 200 may include a DMP that plays both audio and video. Additionally, or alternatively, FER component 420 may employ fewer, different, or additional operations to identify the facial expression of a user. Additionally, or alternatively, although DAP 410 and FER component 420 have been illustrated and described as distinct functional components, in other implementations, DAP 410 may include one or more of the capabilities of FER component 420, and vice versa.

Figure 5:
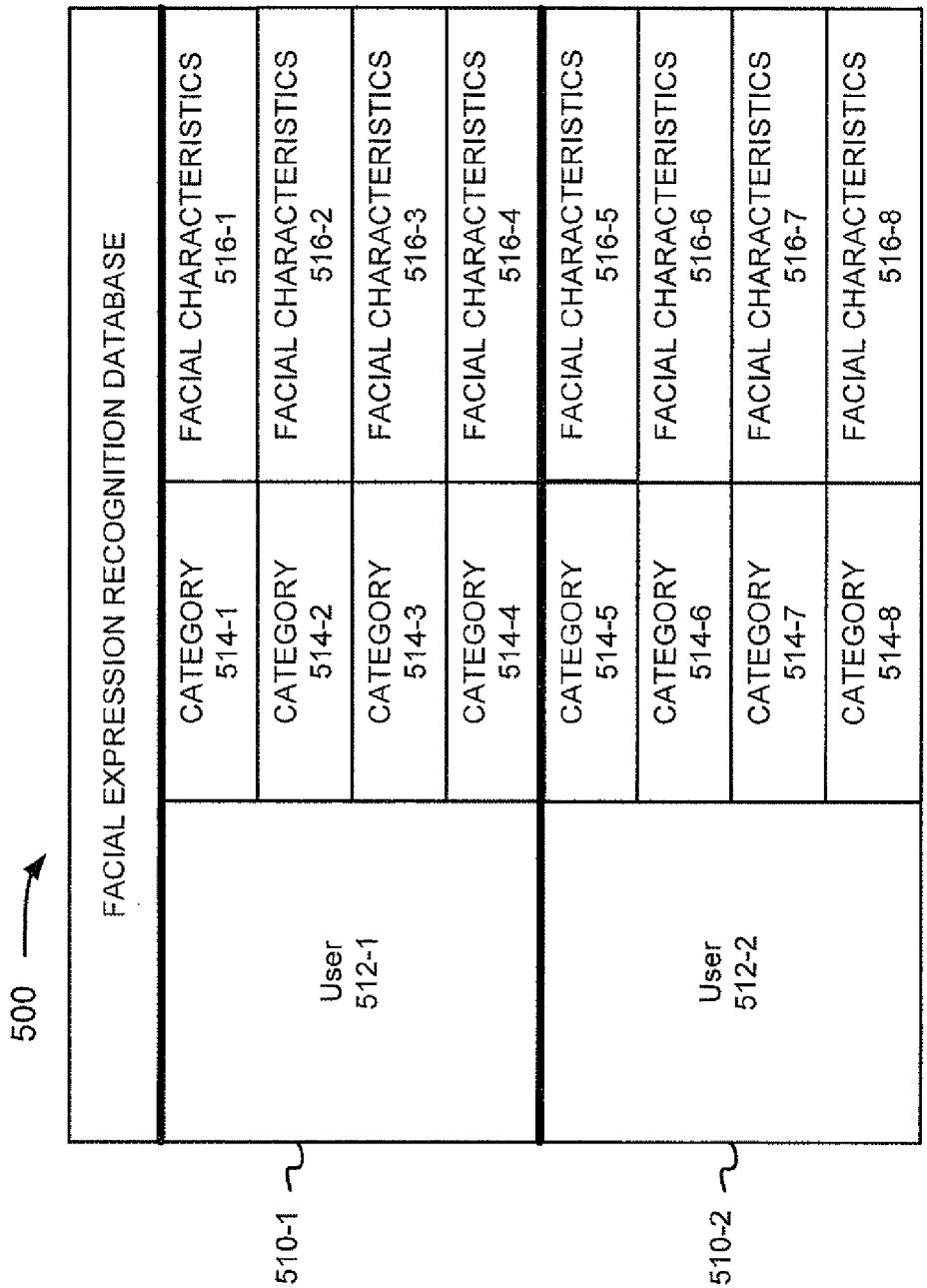
FIG. 5 is a diagram illustrating an exemplary facial expression recognition database that may be implemented by the facial expression recognition depicted in FIG. 4.

FIG. 5 is a diagram illustrating an exemplary facial expression recognition database that may be implemented by the FER depicted in FIG. 4. As illustrated, facial expression recognition (FER) database 500 may include one or more records, such as record 510-1 and record 510-2. In one implementation, each record 510 may include a number of fields. For example, each record 510 may include a user field 512 (e.g., user field 512-1 and user field 512-2), a category field 514 (e.g., category fields 514-1 to 514-8), and a facial characteristics field 516 (e.g., facial characteristics fields 516-1 to 516-8). User field 512 may include facial expression information and/or facial recognition information that may be used to identify a user. Category field 514 may include information for indicating, for example, a category of a user (e.g., a mood, such as sadness, angry, happiness, etc.). As described in greater detail below, category field 514 may also include song information that has been linked to a category. Facial characteristics field 516 may include information related to the facial expression of the user corresponding to category field 514. For example, facial characteristics field 516 may include information related to the relative positions of different facial parts, eye movement and/or general facial movement.

Although FIG. 5 illustrates an exemplary FER database 500, in other implementations, FER database 500 may include fewer, additional, and/or different information than that described in relation to FIG. 5. For example, in other implementations, FER database 500 may not include a user field 512.

Figure 6:
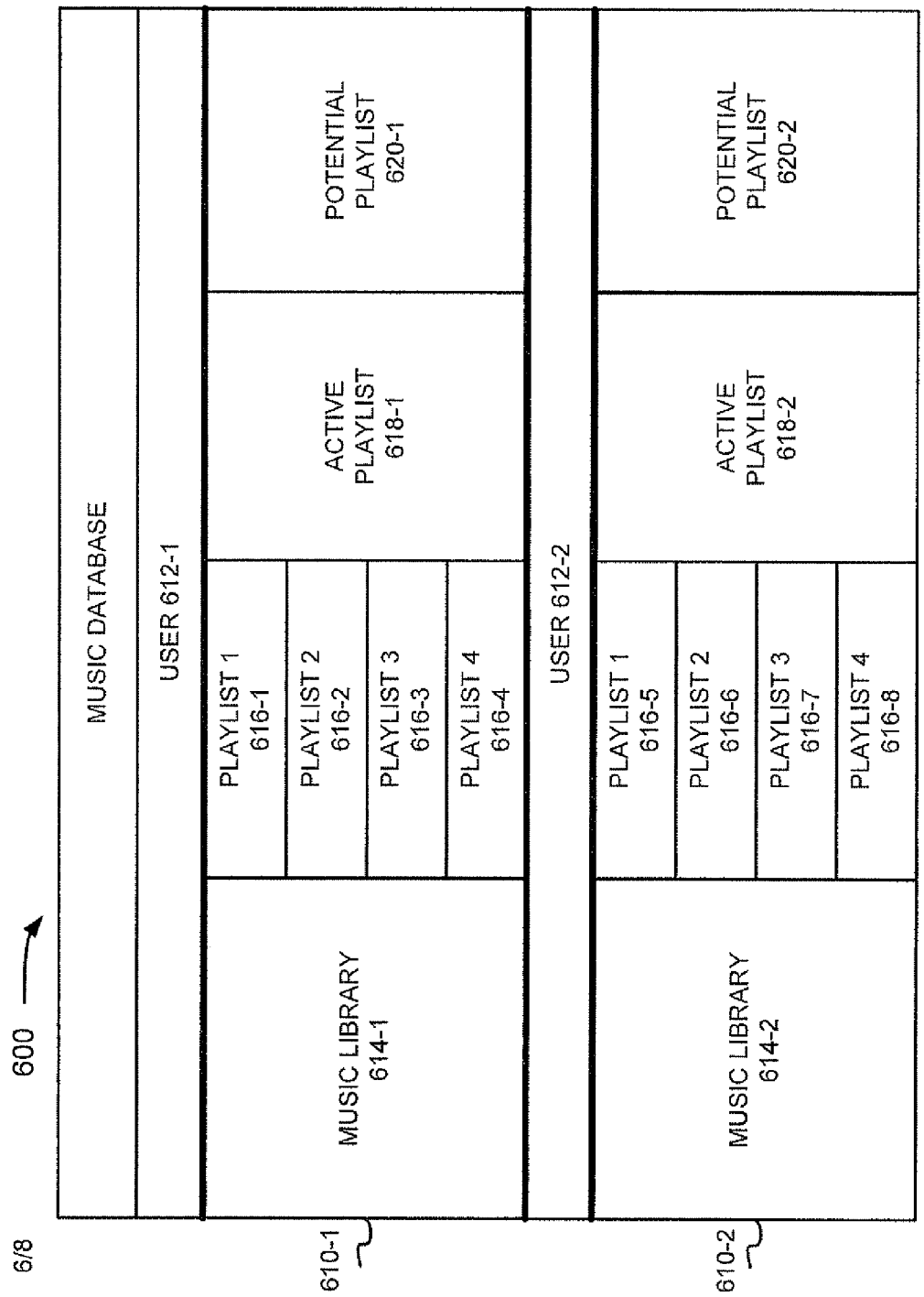
FIG. 6 is a diagram illustrating an exemplary music database that may be implemented by the DAP depicted in FIG. 4.

FIG. 6 is a diagram illustrating an exemplary music database that may be implemented by the DAP depicted in FIG. 4. As illustrated, music database 600 may include one or more records 610, such as record 610-1 and record 610-2. In one implementation, each record 610 may include a number of fields. For example, each record 610 may include a user field 612 (e.g., user fields 612-1 and 612-2), a music library field 614 (e.g., music library fields 614-1 and 614-2), a playlist field 616 (e.g., playlist fields 616-1 to 616-8), an active playlist field 618 (e.g., active playlist fields 618-1 and 618-2), and a potential playlist field 620 (e.g., potential playlist fields 620-1 and 620-2).

User field 612 may include a user's name. In some implementations where only one user utilizes device 200, user field 612 may be omitted. Music library field 614 may include a repository of songs. For example, each song may include, for example, the title of the song, the name of the artist, genre information (e.g., rock, country, alternative, classical, jazz, new age, etc.), album information (e.g., title, year), billboard rating, user rating, and/or frequency played.

Playlist field 616 may include a list of one or more songs. A user may create a playlist by selecting one or more songs from music library field 614. The user may save one or more playlists, as illustrated by playlists 1-4 in fields 616-1 to 616-4 for user 612-1. Active playlist field 618 may include a particular one of playlists 616 that is currently being played by a user. Potential playlist field 620 may include a playlist that may be created based on FER database 500, as will be described in greater detail below.

Although FIG. 6 illustrates an exemplary music database 600, in other implementations, music database 600 may include fewer, additional, and/or different information than that described in relation to FIG. 6.

Figure 7:
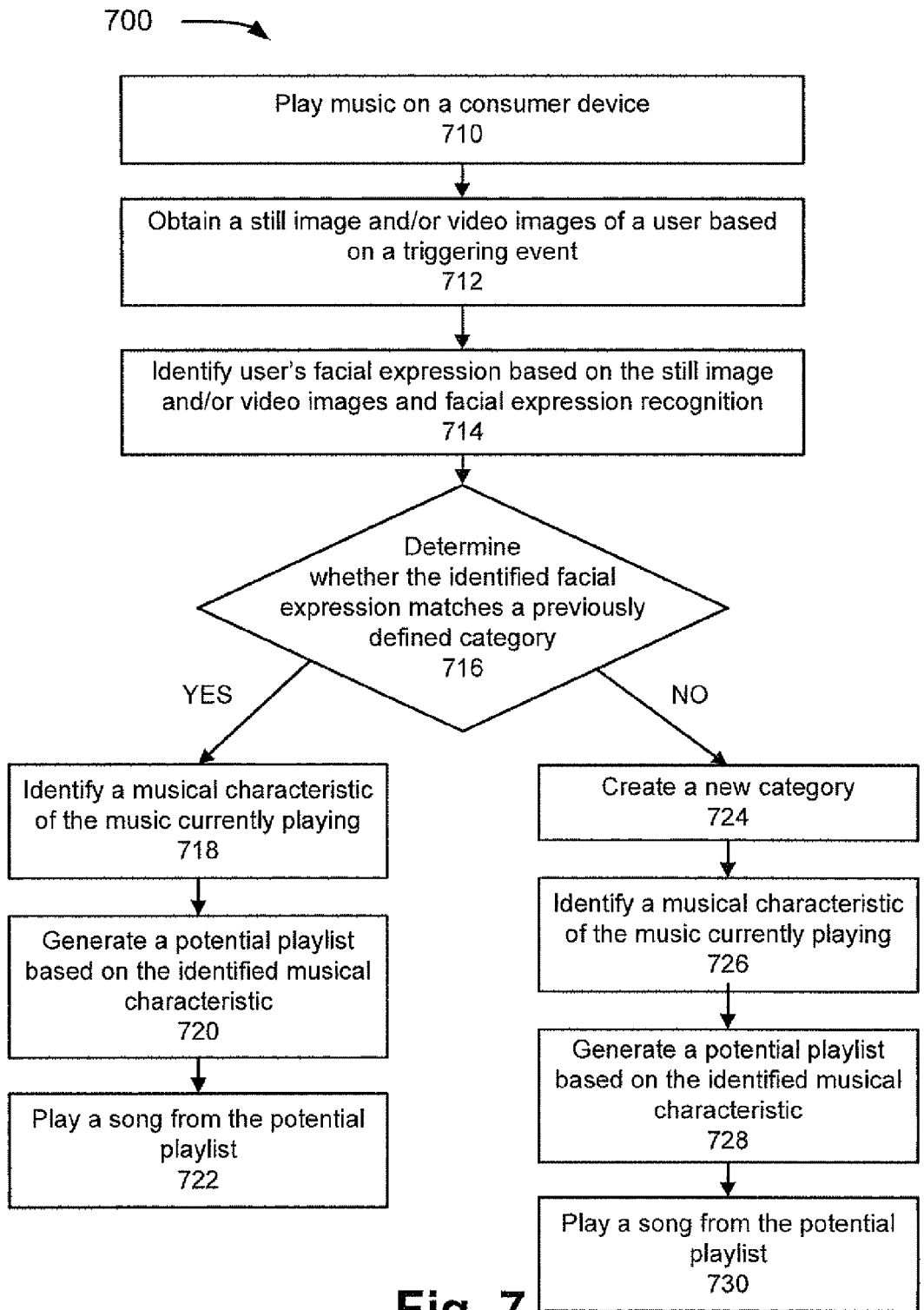
FIG. 7 is a flow chart illustrating an exemplary process for performing concepts described herein.

FIG. 7 is a flow chart illustrating an exemplary process for performing concepts described herein. Process 700 may begin with playing music on a consumer device (Block 710). For example, a user may play a song from music database 600 (e.g., music library 614) using DAP 410 of device 200. The song may be one song from playlist 616, or the song may not be from playlist 616.

In Block 712, a still image and/or video images of a user may be obtained based on a triggering event. For example, camera 260 may capture a still image and/or video images of a user based on a triggering event. An external triggering event may occur, for example, if a user interacts with device 200, such as by playing music on device 200. Additionally, or alternatively, camera 260 may capture a still image and/or video images based on a triggering event internal to device 200. An internal triggering event may include, for example, a timing mechanism (e.g., a clock) that may actuate camera 260 to capture a still image and/or video images of a user if a user is within a certain range and/or view of camera 260. Additionally, or alternatively, camera 260 may capture a still image and/or video images based on a combination of an external triggering event and an internal triggering event. For example, device 200 may include a motion detector (not illustrated in FIG. 2 or FIG. 3) that causes camera 260 to capture a still image and/or video images based on a user's proximity to camera 260 and/or based on whether device 200 is playing music.

In Block 714, a facial expression of a user may be identified based on the still image and/or video images and facial expression recognition. For example, FER component 420 may determine the facial expression of a user based on the still image and/or video still images according to facial expression recognition processes described herein.

Additionally, in one implementation, FER component 420 may compare the facial expression information to user field 512 to determine and/or verify the identity of a user. In other implementations, FER component 420 may not compare the facial expression information to user field 512 to determine and/or verify the identity of a user. For example, FER component 420 may not determine and/or verify the identity of a user based on the facial expression information in instances when, for example, there is only one user of device 200. Alternatively, if there is more than one potential user of device 200, a previous identification operation may be performed by another component of device 200. For example, a user may provide authentication information during a log-in session before access to device 200 is granted.

In Block 716, a determination may be made whether the identified facial expression matches a previously defined category. For example, FER component 420 may compare the identified facial expression of a user to facial characteristics fields 516 of FER database 500 to determine whether a match exists. In one implementation, FER component 420 may determine that a match exists if the identified facial expression is similar enough (e.g., meets a similarity threshold) to the information contained in one of facial characteristics fields 516. Thus, for example, an exact match of information may not be needed.

In one implementation, in instances if an exact match does not exist, yet the information meets a similarity threshold, FER component 420 may update the facial characteristic field 516 corresponding to the matched category based on the identified facial expression information. For example, depending on the facial expression recognition techniques employed, in one implementation, for example, mean values associated with the information of facial characteristics field 516 may be updated.

If a match exists (Block 716—YES), then a musical characteristic of the music currently playing may be identified (Block 718). For example, if FER component 420 determines that a match exists, a link between the matched category 514 and the music currently playing may be made. Additionally, in one implementation, DAP 410 may identify one or more musical characteristics associated with the song currently playing. For example, DAP 410 may identify a currently playing song from, for example, active playlist 618 and identify musical characteristics of the song based on, for example, information contained in music library field 614 and/or active playlist 618. The musical characteristics may relate to, for example, the title, the artist, the album, the user rating, the genre, the tempo, etc. of the currently playing song. As described below, the musical characteristics may be compared to other songs to generate a potential playlist.

In some instances, matched category 514 may include one or more songs previously linked to that particular category. In this regard, the currently playing song may be linked to previously linked songs associated with matched category 514.

In Block 720, a potential playlist may be generated based on the identified musical characteristic. For example, DAP 410 may select one or more songs from music library field 614 that may be similar to the musical characteristic(s) of the song currently playing. More generally, DAP 410 may select one or more songs from music library field 614 that may be similar to various musical characteristics of each linked song in matched category 514. DAP 410 may create a playlist, such as, for example, potential playlist 620 based on the selected songs that are determined to be similar (e.g., similar in tempo, genre, etc.).

In Block 722, a song from the potential playlist may be played. For example, when the current song ends, DAP 410 may select a song from potential playlist 620 to play. DAP 410 may select a song from potential playlist 620 in, for example, a random manner, and/or based on other parameters (e.g., a user rating). In one implementation, a song in potential playlist 620 may include a timestamp and/or remain in potential playlist 620 for only a certain period of time.

If a match does not exist (Block 716—NO), then a new category may be created (Block 724). For example, FER component 420 may create a new category 514 in FER database 500 based on the new facial characteristics 516 if the identified facial expression does not match and/or is not similar enough to any of the information contained in characteristics field 516.

DAP 310 may then perform the operations associated with Block 726, Block 728, and Block 730 may be analogous to the operations previously described in connection with Block 718, Block 720, and Block 722, respectively. That is, in block 726 a musical characteristic of the music currently playing may be identified. In block 728, a potential playlist may be generated based on the identified musical characteristic, and in block 730, a song from the potential playlist may be played. In this manner, a new/different facial expression may be correlated to a particular song and a potential playlist may be created based on the new/different facial expression.

Although FIG. 7 illustrates an exemplary process, in other implementations, fewer, additional or different processes than those depicted in FIG. 7 may be performed. For example, DAP 410 may remove a song from active playlist 618 if the song does not match characteristics of the songs contained in potential playlist 620. Conversely, for example, a song contained in potential playlist 620 may be removed from potential playlist 620 if the song does not match characteristics of the latest determined category 514 based on the user's current expression.

Additionally, or alternatively, DAP 410 and/or FER component 420 may include training and/or learning mechanisms related to the process 700 described above. For example, in the instance that a user selects a different song to be played when a song from potential playlist 620 is playing, DAP 410 and/or FER component 420 may interpret this user action as a negation. That is, DAP 410 and/or FER component 420 may re-interpret, for example, the one or more songs selected for potential playlist 620, and/or the identified musical characteristics associated with the previously playing song (i.e., in reference to Block 718). Further, DAP 410 and/or FER component 420 may create a new potential playlist 620 based on the user selected song.

Additionally, or alternatively, in the instance that a user does not select a different song to be played when a song from potential playlist 620 is playing, DAP 410 and/or FER component 420 may interpret a user's inaction as reinforcement of the selected songs in potential playlist 620 and/or identified category 514. DAP 410 and/or FER component 420 may associate a reinforcement value to each song in potential playlist 620 that have played and/or is playing. The reinforcement value may be used as a correlation between the selected songs and a category (i.e., a mood of the user).

In this manner, the action or inaction of a user if a song from potential playlist 620 is playing, may serve as an indication of approval or disapproval from the user, and in turn, may be interpreted by DAP 410 and/or FER component 420 as a negation or reinforcement of the categorization of the mood of the user, and/or the categorization of the selected song with respect to the mood.

Example

Figure 8:
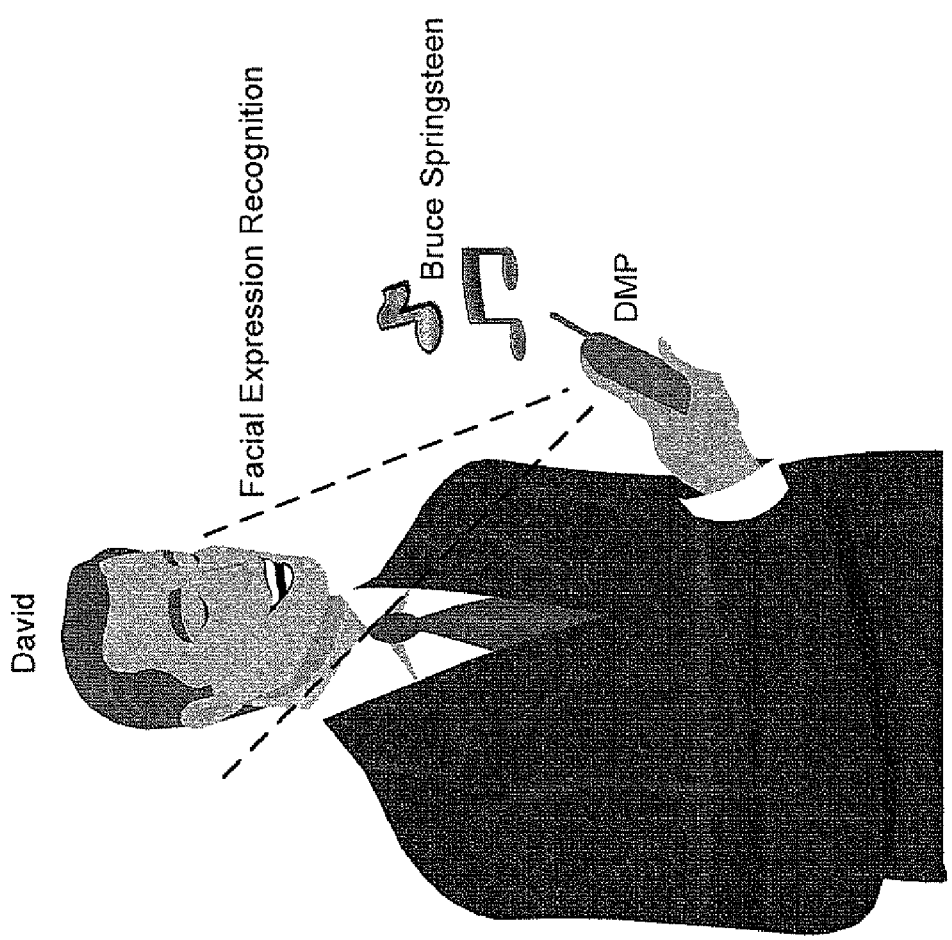
FIG. 8 is a diagram illustrating an example of generating a playlist based on concepts described herein.

FIG. 8 is a diagram illustrating the concepts described herein. As illustrated, David is listening to a Bruce Springsteen song on a mobile phone that includes a DMP. David is in a very happy mood because he recently found out that he won the lottery. As David adjusts the volume of the DMP, camera 260 may capture an image of David's face. Based on the captured image, FER component 420 may determine that the facial expression of David matches a category (e.g., a happy mood category) contained in category field 514 of FER database 500. Category field 514 may include a previously linked song associated with the happy mood category (e.g., a song by Metallica).

The DMP may add a link between the happy category and the Bruce Springsteen song. Additionally, the DMP may add a link between the Bruce Springsteen song and the Metallica song. Further, the DMP may search music library 614 for songs based on the musical characteristics of the Bruce Springsteen song and/or the Metallica song. The DMP may find two more Bruce Springsteen songs in music library 614 and may create a potential playlist 620.

CONCLUSION

The foregoing description of implementations provides illustration, but is not intended to be exhaustive or to limit the implementations to the precise form disclosed. Modifications and variations are possible in light of the above teachings or may be acquired from practice of the teachings. For example, device 200 may provide a way for a user to categorize a song based on facial expression identifiers, such as happy, sad, etc. In this way, FER 420 and/or DAP 310 may create a playlist based on this information. Understandably, the concepts described herein may be applied to, for example, any device used to play music.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of blocks has been described with regard to processes illustrated in FIG. 7, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
capturing an image of a user of the device based on a triggering event, wherein the image includes the user's face;
performing facial expression recognition of the user based on the image;
identifying a facial expression of the user based on the performing;
selecting a playlist that includes one or more songs based on an identified facial expression of the user;
playing a song from the playlist;
determining whether the user selects a different song, which is not included in the playlist, when the song is playing; and
assigning a reinforcement value to the song and a mood category associated with the identified facial expression when the user omits to select the different song.

2. The method of claim 1, wherein the triggering event comprises one of a detected movement of the device or an interaction between the user and the device.

3. The method of claim 1, wherein the performing comprises:
determining a mood category of the user based on the identified facial expression of the user; and the method further comprising:
selecting the song from the playlist based on the determined mood category of the user.

4. The method of claim 1, further comprising:
identifying one or more musical characteristics of the song; and
assigning a categorization to the song based on the one or more musical characteristics.

5. The method of claim 4, further comprising:
determining whether the categorization of the song matches the mood category of the user; and
automatically selectins the song to play when the categorization of the song matches the mood category of the user.

6. The method of claim 1, further comprising:
determining whether the facial expression of the user matches one of previously defined facial characteristic categories; and
selecting the playlist from the one of the previously defined facial characteristic categories when a determination is that the facial expression of the user matches one of the previously defined facial characteristic categories.

7. The method of claim 6, further comprising:
creating a new facial characteristic category when a determination is that the facial expression of the user does not match any of the previously defined facial characteristic categories.

8. The method of claim 1,
further comprising:
creating a new playlist when the user selects the different song.

9. A device comprising:
a camera;
a memory to store instructions; and
a processor to execute the instructions to configure the processor to:
receive an image of a user captured by the camera,
perform facial expression recognition based on the image,
identify a facial expression of the user based on the facial expression recognition,
select a playlist that includes one or more songs based on an identified facial expression of the user,
play a song from the playlist,
determine whether the user selects a different song, which is not included in the playlist, when the song is playing, and assign a reinforcement value to the song and a mood category associated with the identified facial expression when the user omits to select the different song.

10. The device of claim 9, wherein the image of the user is captured based on at least one of the user's interaction with the device or a periodic timing mechanism.

11. The device of claim 9, wherein the processor further executes the instructions to configure the processor to:
   receive a user selection to play a song,
   play the selected song,
   capture an image of the user,
   identify a mood category of the user based on the captured image,
   identify one or more musical characteristics associated with the selected song, and
   generate a potential playlist that includes one or more other songs based on the identified one or more musical characteristics and the mood category of the user based on the captured image.

12. The device of claim 9, wherein the processor further executes the instructions to configure the processor to:
   generate a new playlist when the user selects the different song.

13. The device of claim 9, wherein the processor further executes the instructions to configure the processor to:
   determine whether a mood categorization of the song matches the mood category of the user; and
   select the song to play when the mood categorization of the son matches the mood category of the user.

14. The device of claim 9, wherein the processor further executes the instructions to configure the processor to:
   determine whether the facial expression of the user matches one of previously defined facial characteristic categories; and
   select the playlist from the one of the previously defined facial characteristic categories when a determination is that the facial expression of the user matches one of the previously defined facial characteristic categories.

15. The device of claim 14, wherein the processor further executes the instructions to configure the processor to:
   create a new facial characteristic category when a determination is that the facial expression of the user does not match any of the previously defined facial characteristic categories.

16. A non-transitory computer-readable medium containing instructions executable by at least one processor, the non-transitory computer-readable medium comprising:
   one or more instructions for receiving an image of a user;
   one or more instructions for performing facial expression recognition based on the image;
   one or more instructions for identifying a mood category of the user based on the facial expression recognition of the user image;
   one or more instructions for selecting one or more songs to be played based on the mood category of the user;
   one or more instructions for playing the song;
   one or more instructions for determining whether the user selects a different song when the song is playing; and
   one or more instructions for assigning a reinforcement value to the song when the user omits to select the different song.

17. The non-transitory computer-readable medium of claim 16, further comprising:
   one or more instructions for selecting one or more new songs when the user selects the different song.

18. The non-transitory computer-readable medium of claim 17, further comprising:
   one or more instructions for identifying a mood categorization of the different song; and
   selecting one or more new songs to play having the mood categorization of the different song.

19. The non-transitory computer-readable medium of claim 18, further comprising:
   one or more instructions for determining whether a mood categorization of the son matches the mood category of the user.

20. The non-transitory computer-readable medium of claim 19, further comprising:
   one or more instructions for comparing musical characteristics associated with a song with musical characteristics associated with other songs; and
   one or more instructions for selecting the song as belong to a same mood categorization as at least one of the other songs based on the comparing.

21. The non-transitory computer-readable medium of claim 20, further comprising:
   one or more instructions for assigning a reinforcement value to the mood category of the user.

22. A device comprising:
   means for playing a song;
   means for capturing an image of a user;
   means for determining a mood associated with the user based on the image;
   means for selecting another song to play based on the mood;
   means for playing the other song;
   means for determining whether a user selection is received to play a different song when the other song is playing; and
   means for assigning a reinforcement value to the other song when the user selection is not received.

* * * * *